(12) United States Patent
Yao et al.

(10) Patent No.: US 7,029,640 B2
(45) Date of Patent: Apr. 18, 2006

(54) PROCESS FOR SELECTIVE OXIDATION OF CARBON MONOXIDE IN A HYDROGEN CONTAINING STREAM

(75) Inventors: Jianhua Yao, Bartlesville, OK (US); James B Kimble, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 98 days.

(21) Appl. No.: 10/462,895

(22) Filed: Jun. 17, 2003

(65) Prior Publication Data
US 2004/0258598 A1    Dec. 23, 2004

(51) Int. Cl.
*B01D 53/62*    (2006.01)
(52) U.S. Cl. ..................... 423/247; 423/437.2
(58) Field of Classification Search ........... 423/247, 423/437.2
See application file for complete search history.

(56) References Cited

U.S. PATENT DOCUMENTS

| 4,492,770 A | 1/1985 | Blanchard et al. |
| 4,921,830 A | 5/1990 | Kolts |
| 5,017,357 A | 5/1991 | Kolts et al. |
| 5,157,204 A | 10/1992 | Brown et al. |
| 6,229,995 B1 | 5/2001 | Lee |
| 6,299,995 B1 | 10/2001 | Abdo et al. |
| 6,309,768 B1 | 10/2001 | Patterson, Jr. et al. |

FOREIGN PATENT DOCUMENTS

WO    WO 01/47806 A1    7/2001

*Primary Examiner*—Stuart Hendrickson
(74) *Attorney, Agent, or Firm*—Bronwyn A. Welvaert

(57) ABSTRACT

In a process for oxidizing carbon monoxide with oxygen to carbon dioxide using a composition comprising platinum and iron, a process of at least partially regenerating the composition is disclosed.

14 Claims, 1 Drawing Sheet

PROCESS FOR SELECTIVE OXIDATION OF CARBON MONOXIDE IN A HYDROGEN CONTAINING STREAM

FIELD OF THE INVENTION

The invention relates to the catalytic oxidation of carbon monoxide. In another of its aspects the invention relates to the selective oxidation of carbon monoxide in the presence of hydrogen. In still another aspect the invention relates to the regeneration of catalyst compositions effective in the oxidation of carbon monoxide. In yet another aspect the invention relates to removing as much carbon monoxide as possible, preferably all carbon monoxide, from a stream containing carbon monoxide and hydrogen, particularly, to provide hydrogen feedstock for fuel cells.

BACKGROUND OF THE INVENTION

The selective oxidation of carbon monoxide in hydrogen-rich streams has been of considerable technical interest for the purification of reformed hydrogen used in feed gas in ammonia synthesis. Recently, this selective oxidation process, sometimes referred to as preferential oxidation, has attracted interest due to the possibility of using this technology in providing suitable hydrogen fuel for fuel cells. Since carbon monoxide is also oxidized to provide carbon dioxide for carbon dioxide lasers, the use of a catalytic composition, which previously had been found useful in the oxidation of carbon monoxide for use in carbon dioxide lasers, has also been investigated for adaptation for use in providing carbon monoxide-free hydrogen for fuel cell feedstock.

A fuel cell is an electrochemical device that enables converting the chemical energy of fuels directly to electricity. A hydrogen-air polymer electrolyte membrane (PEM) fuel cell stack is currently considered the best means for adapting this technology to most uses. The PEM fuel cell is most efficient using gaseous hydrogen for fuel. Use of a fuel processor to generate a hydrogen-rich feedstock at the point of use eliminates problems of storage and distribution of the hydrogen fuel.

A fuel processor can convert fuels such as alcohol, gasoline, liquid petroleum gas, or natural gas to a hydrogen-rich stream. By a process of steam reforming a stream consisting primarily of hydrogen, carbon dioxide and carbon monoxide can be produced, but the product is generally saturated with water. Processing this stream in a shift reactor reduces the carbon monoxide content to provide relatively more hydrogen by means of the well-known water-gas-shift reaction. This reaction provides a product that contains from 0.2 to 2 percent carbon monoxide by volume, which is sufficient to poison the platinum-based catalytic composition at the PEM anode. It has now been found that, among other possibilities for removing carbon monoxide to the level necessary to prevent poisoning of the PEM catalyst, the same catalytic composition that is used to recombine carbon monoxide and oxygen in carbon dioxide lasers can be used to provide hydrogen feedstock for fuel cells on a level of carbon monoxide removal that is commercially viable. The operating conditions for the processes are essentially different. The removal of carbon monoxide by selective oxidation of a stream containing both carbon monoxide and hydrogen can be accomplished using the same catalytic composition as used in carbon dioxide lasers by controlling an increased oxygen flow to the oxidation process, raising the operating temperature of the oxidation process and avoiding reaction between oxygen and hydrogen as compared to the conditions used to recombine carbon monoxide and oxygen in carbon dioxide lasers.

SUMMARY OF THE INVENTION

It is an object of this invention is to provide a process that is effective for catalytically oxidizing carbon monoxide with free oxygen. It is another object of this invention to provide a process for converting carbon monoxide (CO) to carbon dioxide ($CO_2$) in the presence of hydrogen; wherein the catalytic composition used is at least partially regenerated.

In accordance with this invention a process is provided for the selective oxidation of carbon monoxide to carbon dioxide in a gaseous mixture comprising hydrogen and carbon monoxide. The process comprises:

(a) contacting a feed stream comprising carbon monoxide, hydrogen and oxygen with a composition comprising platinum and iron in a contacting zone at an operating temperature in the range of from about 60° C. to about 100° C., so as to produce a product stream comprising less carbon monoxide than the feed stream, for a prolonged period of time until the composition is at least partially deactivated thereby forming an at least partially deactivated composition;

(b) increasing the temperature of the contacting zone such that the feed stream is contacted with the at least partially deactivated composition at a regeneration temperature in the range of from about 120° C. to about 250° C. to thereby form an at least partially regenerated composition; and (c) decreasing the temperature of the contacting zone such that the feed stream is contacted with the regenerated composition at the operating temperature in the range of from about 60° C. to about 100° C.

DETAILED DESCRIPTION OF THE INVENTION

Figure 1:
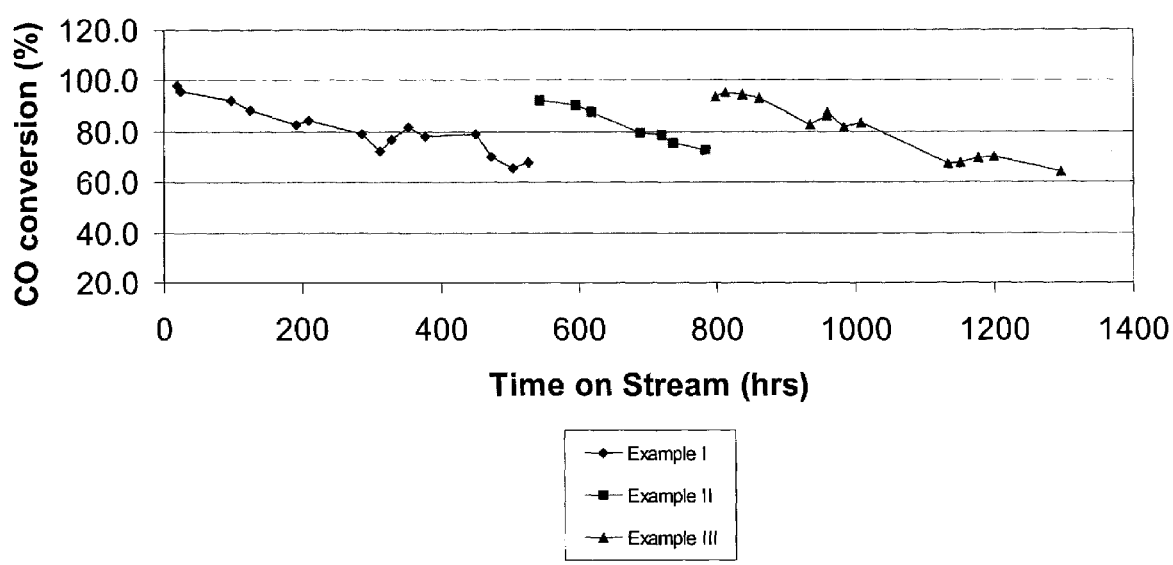
FIG. 1 is a graph plotting the carbon monoxide conversion versus time on stream for a process for oxidizing carbon monoxide with oxygen to carbon dioxide.

According to this invention the process for oxidizing carbon monoxide in a feed stream that also contains hydrogen and oxygen comprises:

(a) contacting a feed stream comprising carbon monoxide, hydrogen and oxygen with a composition comprising platinum and iron in a contacting zone at an operating temperature in the range of from about 60° C. to about 100° C., so as to produce a product stream comprising less carbon monoxide than the feed stream, for a prolonged period of time until the composition is at least partially deactivated thereby forming an at least partially deactivated composition;

(b) increasing the temperature of said contacting zone such that said feed stream is contacted with the at least partially deactivated composition at a regeneration temperature in the range of from about 120° C. to about 250° C. to thereby form an at least partially regenerated composition; and (c) decreasing the temperature of the contacting zone such that the feed stream is contacted with the regenerated composition at the operating temperature in the range of from about 60° C. to about 100° C.

The feed stream to the oxidation process can be formed in any suitable manner, such as by mixing the hydrogen that contains carbon monoxide contaminant with the oxygen containing air at any point before or at a point of contact with the composition.

The process for oxidizing a feed containing carbon monoxide and hydrogen gas can be carried out at any temperature and pressure conditions, for any length of time, any gas hourly space velocity and any volume ratio of $O_2$ to CO that is suitable for selective oxidation of CO in the presence of hydrogen. Generally, the temperature of this process is in a range of about 60° C. to about 100° C., preferably in a range of about 65° C. to about 90° C., and most preferably in a range of 70° C. to 85° C.

The pressure during the oxidation process generally is in the range of about 10 psia to about 1000 psia, preferably 14 psia to 200 psia.

The ratio of moles of $O_2$ in the feed gas to the moles of CO in the feed gas will generally be in the range of about 0.5 to 8.0 mol $O_2$/mol CO, preferably 0.5 to 4.0 mol $O_2$/mol CO, most preferably 0.5 to 1.5 mol $O_2$/mol CO.

The gas hourly space velocity (cc feed gas per cc catalyst per hour) can be in the range of about 100 to about 200,000, preferably from about 5,000 to about 50,000.

The hydrogen will generally be in the range of about 50–90 volume percent and the inlet CO will generally be in the range of about 0.1 to about 5 volume percent.

The preparation of the composition useful in this invention can be carried out by the following process.

Any of the well-known support materials containing metal oxide can be used as support material for the composition of matter used in the process of this invention. Presently preferred are substantially pure alumina (aluminum oxide), clay, silica, a monolith, titania magnesiumaluminate, magnesia, aluminosilicate, and combinations thereof. More preferably, the support material can contain at least 95 weight percent $Al_2O_3$. These materials are readily available commercially.

The impregnation of the support material with platinum and iron can be carried out in any suitable manner. Generally, compounds of platinum and compounds of iron are dissolved in a suitable solvent, preferably water, to prepare a solution of suitable concentration, generally containing from about 0.005 g to about 5.0 g platinum per cc of solution and about 0.005 g to about 5.0 g iron per cc of solution. Suitable compounds of both platinum and iron are nitrates, carboxylates and acetylacetonates, among others, with acetylacetonates currently preferred. Organic solvents, such as methanol, ethanol, acetone, ethyl acetate, toluene and the like can also be used as solvents for platinum or iron.

After impregnation, the impregnated support material is heated to a temperature sufficient to drive off the solvent used in the impregnation. A flow of inert gas across the support material can be used. A temperature in the range of up to about 250° C. applied for about an hour is usually sufficient for the purpose.

The dried composition is heat treated in an oxidizing atmosphere, preferably in an atmosphere containing free oxygen (such as air) generally at a temperature ranging from about 80° C. to about 700° C. for a time ranging from about 0.5 hr to about 10 hours. The heat treatment is preferably done in incremental sub steps. Currently, the heat treatment is carried out at around 150° C. for about 1 hour, around 200° C. for about 2 hours and around 400° C. for about 3 hours. Any combination of heating at a temperature and heating time sufficient to calcine the impregnated support material to obtain at least one platinum oxide, optionally mixed with metallic platinum, and at least one iron oxide satisfies the requirements of this invention.

The composition is then dried and calcined in a suitable manner. The resulting composition has a molar ratio of platinum to iron that is in the range of from about 0.5:1 to about 4:1.

Before use in the process of oxidizing carbon monoxide the composition can be activated by a reduction step that can be carried out in any suitable manner, preferably at a temperature of about 20° C. to about 650° C., more preferably about 200° C. to about 500° C. for about 0.5 hour to about 20 hours, preferably about 1 hour to about 5 hours to enhance the activity of the catalyst composition for catalyzing a low temperature oxidation of CO with $O_2$ in the presence of hydrogen. Any reducing gas can be used: hydrogen, CO, paraffins and the like and mixtures thereof. This reduction step leaves at least a portion of the platinum of the composition in a reduced valence state.

The composition is then contacted with a feed stream comprising carbon monoxide, hydrogen and oxygen in a contacting zone at an operating temperature in the range of from about 60° C. to about 100° C. Preferably, the operating temperature is in the range of from about 65° C. to about 90° C., and most preferably, the operating temperature is in the range of from 70° C. to 85° C.

After the feed stream is contacted with the composition in a contacting zone, a product stream is produced which comprises less carbon monoxide than the feed stream. The process continues for a period of time until the composition is at least partially deactivated, thereby forming an at least partially deactivated composition. The at least partially deactivated composition is formed when the carbon monoxide conversion is less than sixty percent.

Preferably, the at least partially deactivated composition is formed when the carbon monoxide conversion is less than 80 percent.

Most preferably, the at least partially deactivated composition is formed when the carbon monoxide conversion is less than 99.9%.

The term "carbon monoxide conversion" denotes the percentage of carbon monoxide which is converted to a different compound or element.

Then, the temperature of the contacting zone is increased to a regeneration temperature in the range of from about 120° C. to about 250° C. Preferably, the regeneration temperature is in the range of from about 150° C. to about 250° C., and most preferably, the regeneration temperature is in the range of from 175° C. to 225° C. The feed stream is contacted with the at least partially deactivated composition at the regeneration temperature to form an at least partially regenerated composition. The feed stream is contacted with the at least partially deactivated composition at the regeneration temperature for a time period in the range of from about 0.5 to about 10 hours. Preferably, the time period is in the range of from about 1 to about 8 hours, and most preferably in the range of from 2 to 7 hours. At least a portion of the platinum of the at least partially regenerated composition is in a reduced valence state. The temperature is then decreased such that the feed stream is contacted with the regenerated composition once again at the operating temperature.

The following examples are presented in further illustration of the invention and are not to be construed as limiting the scope of the invention.

EXAMPLE I (Control)

A 2.0-gram quantity of a PtFe/$Al_2O_3$ composition was placed into a reactor. A feedstock comprising 73.6% $H_2$, 0.93% CO, 18.6% $CO_2$, 4.5% air, and 2.4% $H_2O$ was contacted with the composition at a rate of 524 cc/min, and at atmospheric pressure. The temperature was set at 80° C. FIG. 1 shows the percentage of carbon monoxide conversion versus the amount of time on stream.

EXAMPLE II (Control)

The composition was then regenerated. A pure hydrogen feed was contacted with the composition, at a rate of 300 cc/min, and at atmospheric pressure. The temperature was raised to 300° C. After two and a half hours, the $H_2$ regeneration ended and the temperature was reduced to 80° C. The feedstock, as described in Example I, was once again contacted with the composition. The carbon monoxide conversion versus the amount of time on stream is shown in FIG. 1.

EXAMPLE III (Inventive)

The composition was then once again regenerated. This time, the temperature was raised to 200° C. The composition was not contacted with a hydrogen feed, but continued to be contacted with the feedstock described in Example I. After four and a half hours, the temperature was reduced to 80° C. The carbon monoxide conversion versus the amount of time on stream is shown in FIG. 1.

As is evident from FIG. 1, the rate of carbon monoxide conversion after the composition was regenerated was approximately the same in Example II and III. These rates were also almost the same as the conversion rate of the composition in Example I, before regeneration. Therefore, it is possible to regenerate this composition at a lower temperature and without the pure hydrogen feed used in Example II.

While this invention has been described in detail for the purpose of illustration, it should not be construed as limited thereby but intended to cover all changes and modifications within the spirit and scope thereof.

What is claimed is:

1. A process for oxidizing carbon monoxide with oxygen to carbon dioxide comprises:
   (a) contacting a feed stream comprising carbon monoxide, hydrogen and oxygen with a composition comprising platinum and iron in a contacting zone at an operating temperature in the range of from about 60° C. to about 100° C., so as to produce a product stream comprising less carbon monoxide than said feed stream, for a prolonged period of time until said composition is at least partially deactivated thereby forming an at least partially deactivated composition;
   (b) increasing the temperature of said contacting zone such that said feed stream is contacted with said at least partially deactivated composition at a regeneration temperature in the range of from 150° C. to 250° C. to thereby form an at least partially regenerated composition; and
   (c) decreasing the temperature of said contacting zone such that said feed stream is contacted with said regenerated composition at said operating temperature in the range of from about 60° C. to about 100° C.

2. A process as recited in claim 1 wherein at least a portion of the platinum of said composition is in a reduced valence state.

3. A process as recited in claim 1 wherein at least a portion of the platinum of said at least partially regenerated composition is in a reduced valence state.

4. A process as recited in claim 1 wherein said operating temperature of steps (a) and (c) is in the range of from about 65° C. to about 90° C.

5. A process as recited in claim 1 wherein said operating temperature of steps (a) and (c) is in the range of from 70° C. to 85° C.

6. A process as recited in claim 1 wherein said regeneration temperature of step (b) is in the range of from 175° C. to 225° C.

7. A process as recited in claim 1 wherein said at least partially deactivated composition is formed when the carbon monoxide conversion is less than 60%.

8. A process as recited in claim 1 wherein said at least partially deactivated composition is formed when the carbon monoxide conversion is less than 80%.

9. A process as recited in claim 1 wherein said at least partially deactivated composition is formed when the carbon monoxide conversion is less than 99.9%.

10. A process as recited in claim 1 wherein said feed stream is contacted with said at least partially deactivated composition at said regeneration temperature in step (b) for a time period in the range of from about 0.5 to about 10 hours.

11. A process as recited in claim 1 wherein said feed stream is contacted with said at least partially deactivated composition at said regeneration temperature in step (b) for a time period in the range of from about 1 to about 8 hours.

12. A process as recited in claim 1 wherein said feed stream is contacted with said at least partially deactivated composition said regeneration temperature in step (b) for a time period in the range of from 2 to 7 hours.

13. A process as recited in claim 1 wherein said composition further comprises a support selected from the group consisting of clay, alumina, silica, a monolith, titania magnesiumaluminate, magnesia, aluminosilicate and combinations thereof.

14. A process as recited in claim 1 wherein the molar ratio of platinum to iron of said composition is in the range of from about 0.5:1 to about 4:1.

* * * * *